United States Patent [19]

Clausen

[11] Patent Number: 5,492,207
[45] Date of Patent: Feb. 20, 1996

[54] ENERGY ABSORBING STRUCTURES AND METHOD OF PROVIDING SUCH STRUCTURES

[75] Inventor: Edvin L. Clausen, Tønder, Denmark

[73] Assignee: Norsk Hydro a.s., Oslo, Norway

[21] Appl. No.: 923,946

[22] PCT Filed: Mar. 6, 1991

[86] PCT No.: PCT/NO91/00034

§ 371 Date: Aug. 31, 1992

§ 102(e) Date: Aug. 31, 1992

[87] PCT Pub. No.: WO91/14110

PCT Pub. Date: Sep. 19, 1991

[30] Foreign Application Priority Data

Mar. 6, 1990 [NO] Norway ..................................... 901062

[51] Int. Cl.$^6$ ........................................ F16F 7/12
[52] U.S. Cl. ........................................ 188/377; 188/374
[58] Field of Search ..................... 188/377, 371, 188/374; 293/133; 213/1 A; 280/784; 74/492; 148/699

[56] References Cited

U.S. PATENT DOCUMENTS

| | | |
|---|---|---|
| 3,716,953 | 2/1973 | Moore ............................... 52/2 |
| 3,774,952 | 11/1973 | Zorn ............................... 293/69 R |
| 3,851,542 | 12/1974 | Adams et al. .................. 74/492 |
| 3,972,744 | 8/1976 | Cantrell ........................... 148/12.4 |
| 3,983,962 | 10/1976 | Torke . | |
| 4,023,652 | 5/1977 | Torke . | |
| 4,133,549 | 1/1979 | Reidelbach et al. . | |
| 4,152,012 | 5/1979 | Reidelbach et al. . | |
| 4,194,763 | 3/1980 | Reidelbach et al. . | |
| 4,545,236 | 10/1985 | Turczyn .......................... 188/377 X |
| 4,907,735 | 3/1990 | Ushioda et al. . | |
| 4,991,897 | 2/1991 | Karapetian .................... 296/29 |

FOREIGN PATENT DOCUMENTS 2505340  2/1976  Germany ................................... 74/492

OTHER PUBLICATIONS

Patent Abstracts of Japan, vol. 17, No. 211, M243, abstract of JP 58–105881, publ. Jun. 23, 1983.

*Primary Examiner*—Robert J. Oberleitner
*Assistant Examiner*—Lee W. Young
*Attorney, Agent, or Firm*—Wenderoth, Lind & Ponack

[57] ABSTRACT

An energy absorbing structure is employed in a front or rear portion of a vehicle body. The structure is in the form of a unitary and one-piece longitudinally extending aluminum or aluminum alloy member that is extruded to have a substantially uniform cross section. The member is subjected to an aging heat treatment operation to impart a material strength to the member. Subsequently, at least one longitudinal zone of the member is subjected to an overaging heat treatment to thereby lower the material strength of such zone. As a result, by the member being subjected to longitudinally differential heat treatment, the member has material strengths differing longitudinal of the member. Upon an impact being imparted to the portion of the vehicle body, a force acting on the member will cause the zone thereof to be subjected to axial compression deformation.

6 Claims, 2 Drawing Sheets

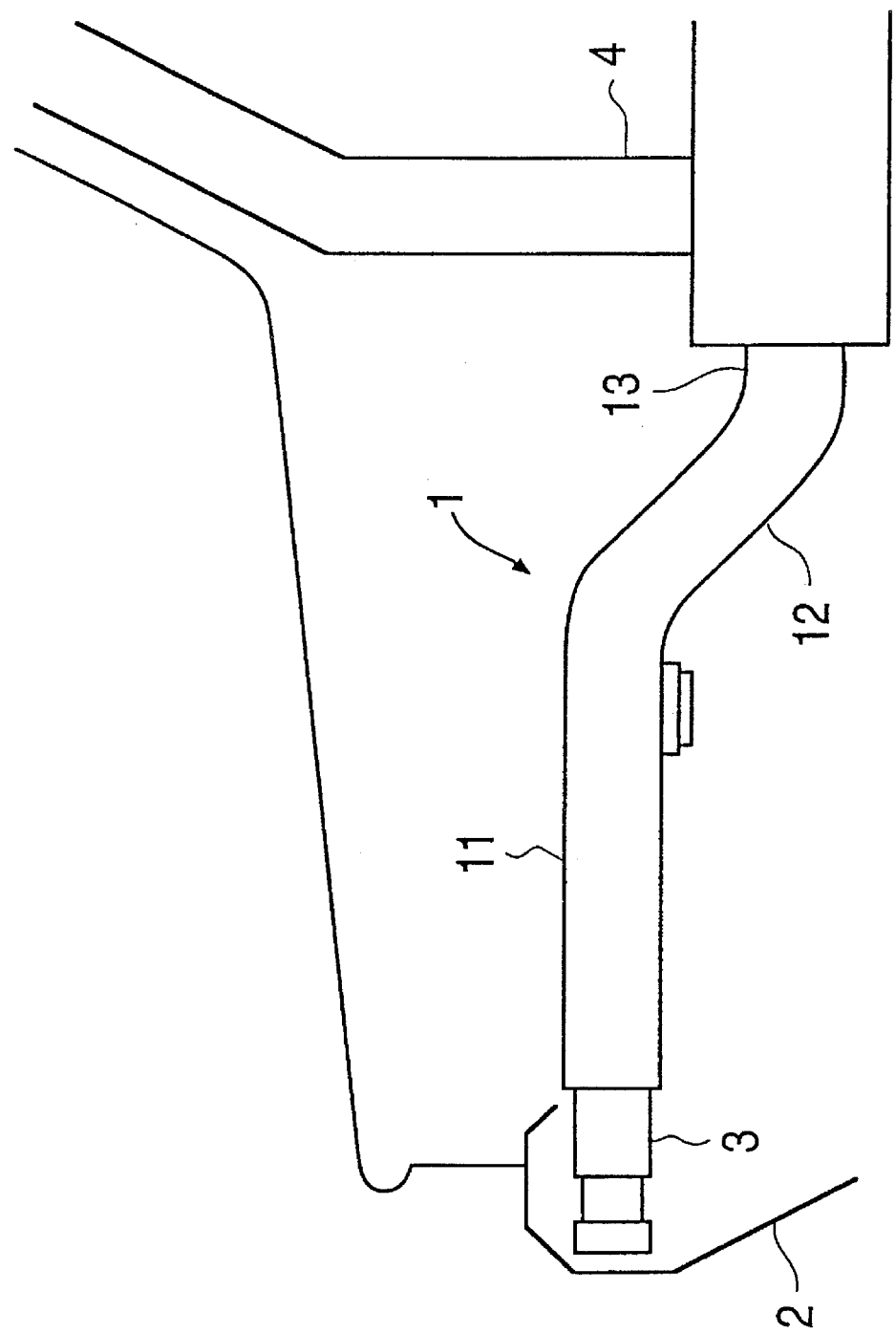

ENERGY ABSORBING STRUCTURES AND METHOD OF PROVIDING SUCH STRUCTURES

BACKGROUND OF THE INVENTION

The present invention relates to energy absorbing structures used in assemblies exposed to impact loads to control the amount of resulting damage to the assemblies and to protect the occupants or contents thereof. More particularly the invention relates to energy absorbing structures incorporated into motor vehicle frames to absorb impact energy and to a method of providing such structures.

The ever increasing number of road accidents has resulted in development of the present basic car body concept comprising a rigid cabin for occupants and deformable body parts having a high energy absorption capacity forwardly and rearwardly of the cabin. Aluminum and alloys thereof, due to excellent corrosion behavior, good extrudability, high ductility and low specific weight, consequently are natural material choices for motor vehicle body parts. However, the specific mass energy absorption of an aluminum extrusion construction having the same stiffness as steel sheet constructions, which have so far been used as energy absorbing structures in vehicles, can be twice as high as that of such steel sheet constructions. Such substantially higher specific energy absorption applied in the front part of vehicle would result in higher forces acting on vehicle occupants during a frontal collision. This means that in order to achieve a complete control of the energy absorption and the progressive collapse of the deformable body parts, ensuring a sufficient deceleration path so that the physical capacity of human bodies to survive a sudden stop is not exceeded, a simple switch over to application of, e.g., extruded Al-shapes in the energy absorbing structure is not possible.

Several approaches are known from the prior art to resolve this problem by e.g. provision of several individual sections having different material characteristics and being connected together by mechanical means or provision of reinforcing means attached outside or inside of the extruded shape at predetermined locations along an underdimensioned cross-section of the shape.

Apart from offering a rather complicated solution comprising several parts and the necessity of a laborious assembling operation, the provision of a reduced cross-section of the shape in the latter case also means reduced strength or stiffness of the structure overall, which is not desirable for the normal handling and performance of the vehicle frame.

SUMMARY OF THE INVENTION

Consequently, it is an object of the present invention to provide a new energy absorbing structure avoiding the above drawbacks and enabling a simple assembly of the structure.

This and other objects according to the present invention are achieved by provision of a longitudinal bearing member differentially heat treated to have varying strength longitudinally.

BRIEF DESCRIPTION OF THE DRAWINGS

The invention will now be described in more details by the way of examples and preferred embodiments and with reference to the accompanying drawings, wherein:

FIG. 1 is a schematical cross-sectional view of an energy absorbing structure assembly;

DETAILED DESCRIPTION OF THE INVENTION

Figure 2A:
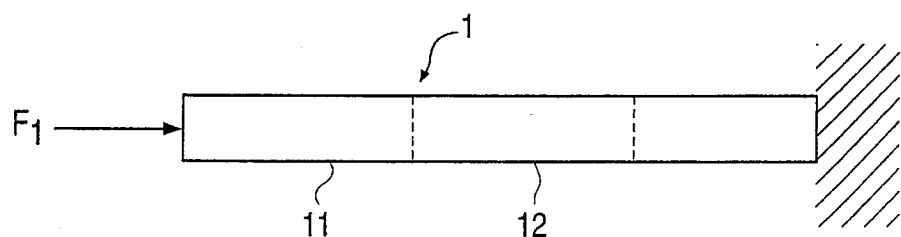
FIGS. 2a–2c are schematic views a heat treated longitudinal bearing member exposed to increasing impact loads.

FIG. 1 shows schematically a cross-section of a motor vehicles front brace or part comprising a longitudinal front bearing member 1 extending from a side sill 4 towards a bumper 2. A hydraulic impact absorber 3 extending between the bumper and the front brace is an optional additional equipment. Such hydraulic absorbers are installed in order to ensure that under a low speed collision, up to approximately 5 km/h, all the impact energy is absorbed without any permanent deformation of the front bearing member.

Impacts already at rather moderate speeds of from 15 to 20 km/h will result in a permanent deformation of the structure, especially the front bearing members, requiring repair or exchange of the deformed parts.

According to the present invention it has been found that by conducting a special heat treatment of the front part 11 of the longitudinal front bearing member 1 made of hardened Al-alloy the strength of the treated part can be substantially reduced, while the stiffness of the member overall is unchanged. Simultaneously the ductility will increase and thus a better formability during deformation is ensured. In this way a complete control of the energy absorption can be achieved, e.g. deformation will occur at an almost 50% reduction of energy absorption in the deformation zone 11 compared to the original material state condition.

EXAMPLE 1

Tubes having diameters of 30 mm and a wall thickness of 2 mm were extruded of Al-alloy 6060 (AlMgSi 0.5) and aged at 185° C. for 4 hours reaching a yield strength of 230 N/mm$^2$. Series of samples of such tubes were then subjected to a following overaging heat treatment at 350° C., varying the exposure time from 5 to 30 minutes and measuring the material strength, as shown in the following Table.

| Sample No. | Exposure time at 350° C. in min. | Yield strength in N/mm$^2$ |
| --- | --- | --- |
| 0 | 0 | 230 |
| 1 | 5 | 220 |
| 2 | 10 | 185 |
| 3 | 15 | 165 |
| 4 | 20 | 150 |
| 5 | 25 | 130 |
| 6 | 30 | 120 |

Compression tests were conducted on the above heat treated tube samples having a height of 100 mm. The forces (loads) required to reduce the tubes down to 30 mm were measured for tubes treated at different temperatures. While a force of 40.7 kN had to be applied on the tube heat treated for 5 minutes, the force was reduced to 22.3 kN for the tubes treated for 30 minutes, which represents a reduction of 45%.

EXAMPLE 2

An extruded heat treated (aged) Al-alloy beam 1, as schematically illustrated in FIG. 2a, has a front part 11 being exposed to an overaging heat treatment, e.g. by means of local induction heating of the part. The beam was then fastened in a fixture and axially subjected to a force F increasing stepwise from F1 to F3.

Figure 2B:
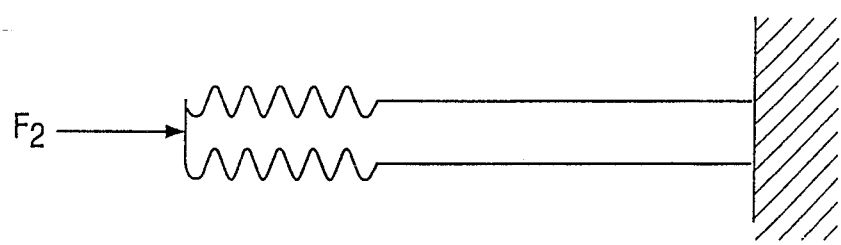
Figure 2C:
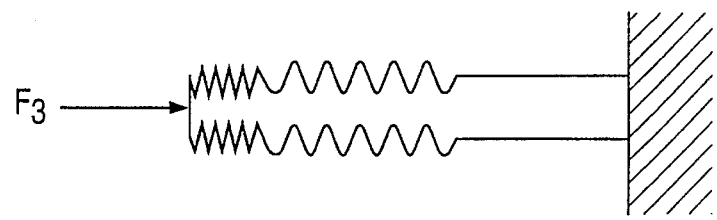
Figure 2D:
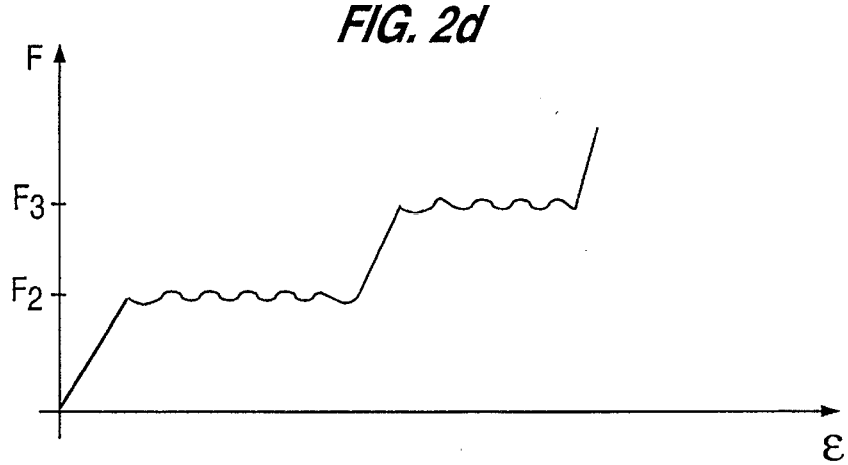
FIG. 2d is a graph illustrating the energy/path characteristics of the member and loads of FIGS. 2a–2c.

The resulting progressive compression deformation of the beam starting under the load F2 is limited to the overaged front part 11 (FIG. 2*b*). Only at increased loads F3 does also the adjacent beam part 12 also start to absorb the energy by folding (FIG. 2*c*). FIG. 2*d* is a force/path diagram, where F denominates applied force and ε deformation path, and illustrates graphically the achieved axial deformation of the beam of FIGS. 2*a*–2*c*.

The actual applied forces to achieve the illustrated energy absorption by an axial compression deformation of the beam are related further to the type of alloys employed and heat treatment applied and also are dependent on the configuration (shape) of the beam and its dimensions. It is important that the temperature used is so low that the actual alloy material will not start any natural aging after such heat treatment but will remain stable over time.

Obviously, there are several advantages connected to energy absorbing structural members provided according to the present invention. An entire single piece member can be provided in one step, e.g. by extrusion of an appropriate heat treatable Al-alloy, and is then subsequently differentially heat treated so that different deformation zones exhibiting different strengths along the member are provided. Thus, referring to FIG. 1, the front part 11 of the longitudinal member 1 can be heat treated to reduce the energy absorption capability by approximately 50%, while the following parts (deformation zones) 12 and 13 will remain in, e.g., half hard and hard conditions, respectively.

During a collision at moderate speed, e.g. below 35 km/h, only the front part 11 will be affected and deformed and could easily be exchanged by cutting it away and welding a new part 11 to the remaining parts 12 and 13. Only at higher impact loads will the parts 12 and 13 will absorb the impact energy by folding, bending and/or distortion demanding exchange of the entire energy absorbing structural member.

While the invention has been described in terms of preferred embodiments, it is apparent that modifications may be made thereto without departing from the spirit or scope of the invention as set forth in the appended claims. The energy absorbing structure can also be used in, e.g., containers for cargo to protect the cargo from damage or air landing pallets to absorb ground impact loads.

I claim:

1. An energy absorbing load bearing structure for a front or a rear portion of a frame of a vehicle body and to be oriented to extend in a direction toward an expected impact, said structure comprising:

a unitary and one-piece longitudinally extending extruded member having a substantially uniform cross section resulting from extrusion of aluminum or aluminum alloy;

said member having an end zone to be directed in the direction of the expected impact;

said member having a length portion extending along the entire length of said member except for said end zone;

said length portion having a material strength resulting from an aging heat treatment thereof; and said end zone having a material strength, resulting from an overaging heat treatment thereof, sufficiently lower than said material strength of said length portion such that said end zone is capable of axial compression deformation by a force acting on said end zone upon an impact being imparted to the portion of the vehicle body.

2. A structure as claimed in claim 1, wherein said member includes at least one further zone spaced longitudinally of said end zone and having a material strength different from that of said end zone.

3. A structure as claimed in claim 1, wherein said member comprises a front load bearing member of a vehicle frame and is formed of aluminum alloy, and said end zone comprises a forward portion of said front load bearing member.

4. A front or rear portion of a vehicle body and including an energy absorbing structure comprising:

a unitary and one-piece longitudinally extending extruded member having a substantially uniform cross section resulting from extrusion of aluminum or aluminum alloy;

said member having an end zone to be directed in a direction of the expected impact;

said member having a length portion extending along the entire length of said member except for said end zone;

said length portion having a material strength resulting from an aging heat treatment thereof; and said end zone having a material strength, resulting from an overaging heat treatment thereof, sufficiently lower than said material strength of said length portion such that said end zone is capable of axial compression deformation by a force acting on said end zone upon an impact being imparted to said portion of the vehicle body.

5. A portion including a structure as claimed in claim 4, wherein said member includes at least one further zone spaced longitudinally of said end zone member and having a material strength different from that of said end zone.

6. A portion including a structure as claimed in claim 4, wherein said member comprises a front load bearing member of a frame of the vehicle body and is formed of aluminum alloy, and said end zone comprises a forward portion of said front load bearing member.

\* \* \* \* \*